US012665129B2

(12) United States Patent
Kang et al.

(10) Patent No.: US 12,665,129 B2
(45) Date of Patent: Jun. 23, 2026

(54) MULTILAYERED CAPACITOR

(71) Applicant: SAMSUNG ELECTRO-MECHANICS CO., LTD., Suwon-si (KR)

(72) Inventors: Sunghyung Kang, Suwon-si (KR); Hongje Choi, Suwon-si (KR); Oknam Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 291 days.

(21) Appl. No.: 18/140,978

(22) Filed: Apr. 28, 2023

(65) Prior Publication Data

US 2024/0112862 A1 Apr. 4, 2024

(30) Foreign Application Priority Data

Sep. 30, 2022 (KR) ........................ 10-2022-0125182

(51) Int. Cl.
*H01G 4/012* (2006.01)
*H01G 4/30* (2006.01)

(52) U.S. Cl.
CPC .............. *H01G 4/012* (2013.01); *H01G 4/30* (2013.01)

(58) Field of Classification Search
CPC .......... H01G 4/012; H01G 4/30; H01G 4/232; H01G 4/005
USPC ............. 361/301.4, 321.1, 321.3, 303, 306.3
See application file for complete search history.

(56) References Cited

U.S. PATENT DOCUMENTS

| | | | | |
|---|---|---|---|---|
| 5,822,174 A | * | 10/1998 | Yamate .................... | H03H 1/00 |
| | | | | 361/306.3 |
| 2012/0268860 A1 | * | 10/2012 | Chung .................. | H01G 4/232 |
| | | | | 361/301.4 |
| 2015/0116892 A1 | * | 4/2015 | Park .................... | H05K 1/0231 |
| | | | | 361/275.3 |
| 2015/0287549 A1 | * | 10/2015 | Park ...................... | H01G 4/005 |
| | | | | 361/270 |

(Continued)

FOREIGN PATENT DOCUMENTS

| | | |
|---|---|---|
| CN | 216353801 U | 4/2022 |
| KR | 10-0568305 B1 | 4/2006 |
| KR | 10-2007-0119893 A | 12/2007 |

OTHER PUBLICATIONS

Extended European Search Report dated Apr. 16, 2024 issued in European Patent Application No. 23173855.0.

(Continued)

*Primary Examiner* — Arun Ramaswamy

(74) *Attorney, Agent, or Firm* — Morgan, Lewis & Bockius LLP

(57) ABSTRACT

A multilayered capacitor according to an embodiment includes a capacitor body including a dielectric layer and a first internal electrode layer and a second internal electrode layer stacked with the dielectric layer interposed therebetween, a first external electrode and a second external electrode on both sides of the capacitor body in the longitudinal direction, and 2n or more terminal electrodes on both sides of the capacitor body in a width direction. The first internal electrode layer includes n+1 first internal electrode patterns, the second internal electrode layer includes n second internal electrode patterns, and n is an integer greater than or equal to 1.

19 Claims, 15 Drawing Sheets

(56)  References Cited

U.S. PATENT DOCUMENTS

| | | | |
|---|---|---|---|
| 2015/0325378 A1* | 11/2015 | Park | H03H 7/01 |
| | | | 333/185 |
| 2016/0189867 A1* | 6/2016 | Zaima | H01G 4/012 |
| | | | 361/301.4 |
| 2018/0226191 A1 | 8/2018 | Yoshida et al. | |
| 2019/0148073 A1 | 5/2019 | Lee et al. | |
| 2021/0027949 A1 | 1/2021 | Kobayashi et al. | |
| 2022/0165494 A1 | 5/2022 | Kim et al. | |

OTHER PUBLICATIONS

Office Action dated Jan. 9, 2026 of the corresponding Korean Patent Application No. 10-2022-0125182 with English translation.

* cited by examiner

123 { 123a
      123b

122 : 122a

MULTILAYERED CAPACITOR

CROSS-REFERENCE TO RELATED APPLICATION

This application claims priority to and the benefit of Korean Patent Application No. 10-2022-0125182 filed in the Korean Intellectual Property Office on Sep. 30, 2022, the entire contents of which are incorporated herein by reference.

TECHNICAL FIELD

This disclosure relates to a multilayered capacitor.

BACKGROUND

A multilayered capacitor (multilayered ceramic capacitor (MLCC)) has a structure in which first internal electrodes and second internal electrodes are alternately stacked, and dielectric layers are disposed therebetween. The first internal electrode and the second internal electrode are respectively connected to a first external electrode and a second external electrode, realizing capacity.

Herein, the first internal electrodes and the second internal electrodes are alternately stacked and coupled in parallel, and the capacity of the multilayered capacitor is determined by the number of the internal electrodes, a stacked area, and a dielectric constant of the dielectric layers, which is in general one type of capacity.

SUMMARY

One aspect of the present disclosure may provide a multilayered capacitor capable of realizing two or more capacities in one multilayered capacitor.

A multilayered capacitor according to one aspect includes a capacitor body including a dielectric layer and a first internal electrode layer and a second internal electrode layer stacked with the dielectric layer interposed therebetween, a first external electrode and a second external electrode on both sides of the capacitor body in a longitudinal direction, and 2n or more terminal electrodes on both sides of the capacitor body in a width direction. The first internal electrode layer includes n+1 first internal electrode patterns, the second internal electrode layer includes n second internal electrode patterns, and n is an integer greater than or equal to 1.

The capacitor body may include a first surface and a second surface facing each other in a stacking direction of the first internal electrode layer and the second internal electrode layer; a third surface and a fourth surface connected to the first surface and second surface and facing each other in the longitudinal direction; and a fifth surface and a sixth surface connected to the first surface and the second surface, connected to the third surface and the fourth surface, and facing each other in the width direction.

The first external electrode may be disposed on the third surface of the capacitor body.

The second external electrode may be disposed on the fourth surface of the capacitor body.

The terminal electrodes may be disposed on the fifth surface and sixth surface of the capacitor body.

The n+1 first internal electrode patterns may be disposed at intervals along the longitudinal direction.

The first internal electrode layer may have a division portion extending in the width direction between the n+1 first internal electrode patterns.

An average length in the longitudinal direction of the division portion may be greater than or equal to about 5 μm.

One of the n+1 first internal electrode patterns may be connected to the first external electrode, and another one of the n+1 first internal electrode patterns may be connected to the second external electrode.

One of the n second internal electrode patterns may be connected to two or more of the 2n or more terminal electrodes.

The two or more terminal electrodes connected to the one second internal electrode pattern may be spaced apart from each other.

One of the n second internal electrode patterns may have two or more draw-out patterns connected to two or more of the 2n or more terminal electrodes.

An average length in the longitudinal direction of the draw-out patterns may be about 150 μm to about 250 μm.

An average length in the longitudinal direction of the terminal electrode may be about 190 μm to about 500 μm.

n+1 may be three or more, and the remaining first internal electrode patterns, except for two first internal electrode patterns of the n first internal electrode patterns respectively connected to the first external electrode and the second external electrode, may not be connected to the first external electrode, the second external electrode, and the 2n or more terminal electrodes.

The n second internal electrode patterns may be disposed at intervals along the longitudinal direction.

The second internal electrode layer may have a division portion extending in the width direction between the n second internal electrode patterns.

An average length in the longitudinal direction of the division portion may be greater than or equal to about 5 μm.

The n second internal electrode patterns may be configured to be overlapped with two or more of the n+1 first internal electrode patterns.

The n+1 first internal electrode patterns may have the same average length in the longitudinal direction.

The n second internal electrode patterns may have the same average length in the longitudinal direction.

The n+1 first internal electrode patterns may have different average lengths in the longitudinal direction.

The n second internal electrode patterns may have different average lengths in the longitudinal direction.

The first external electrode may include a first base electrode in contact with the capacitor body, a first middle electrode configured to cover the first base electrode, and a first surface electrode configured to cover the first middle electrode.

The second external electrode may include a second base electrode in contact with the capacitor body, a second middle electrode configured to cover the second base electrode, and a second surface electrode configured to cover the second middle electrode.

Each of the first i middle electrode and the second middle electrode may include a conductive metal and a base resin.

A multilayered capacitor according to another aspect includes a capacitor body including a dielectric layer and a first internal electrode layer and a second internal electrode layer stacked with the dielectric layer interposed therebetween, a first external electrode and a second external electrode on both sides of the capacitor body in a longitudinal direction, and a first terminal electrode and a second terminal electrode on both sides of the capacitor body in a width direction. The first internal electrode layer includes a 1-1 internal electrode pattern connected to the first external electrode and a 1-2 internal electrode pattern connected to the second external electrode, and the second internal electrode layer includes a second internal electrode pattern connected to the first terminal electrode and the second terminal electrode.

The first internal electrode layer may include the 1-1 internal electrode pattern and the 1-2 internal electrode pattern disposed at intervals along the longitudinal direction.

The first internal electrode layer may have a division portion extending in a width direction between the 1-1 internal electrode pattern and the 1-2 internal electrode pattern.

An average length in the longitudinal direction of the division portion may be greater than or equal to about 5 μm.

The second internal electrode pattern may be configured to be overlapped with the 1-1 internal electrode pattern and the 1-2 internal electrode pattern.

The 1-1 internal electrode pattern and the 1-2 internal electrode pattern may have the same average length in the longitudinal direction.

The 1-1 internal electrode pattern and the 1-2 internal electrode pattern may have different average lengths in the longitudinal direction.

A multilayered capacitor according to another aspect includes a capacitor body including a dielectric layer and a first internal electrode layer and a second internal electrode layer stacked with the dielectric layer interposed therebetween, a first external electrode and a second external electrode on both sides of the capacitor body in a longitudinal direction, and a first terminal electrode to a fourth terminal electrode on both sides of the capacitor body in a width direction. The first internal electrode layer includes a 1-1 internal electrode pattern connected to the first external electrode, a 1-2 internal electrode pattern connected to the second external electrode, and a 1-3 internal electrode pattern disposed at intervals in the longitudinal direction between the 1-1 internal electrode pattern and the 1-2 internal electrode pattern, and the second internal electrode layer includes a 2-1 internal electrode pattern connected to the first terminal electrode and the second terminal electrode and a 2-2 internal electrode pattern connected to the third terminal electrode and the fourth terminal electrode.

The 2-1 internal electrode pattern may be configured to be overlapped with the 1-1 internal electrode pattern and the 1-2 internal electrode pattern.

The 2-2 internal electrode pattern may be configured to be overlapped with the 1-2 internal electrode pattern and the 1-3 internal electrode pattern.

The 1-1 internal electrode pattern and the 1-2 internal electrode pattern may have the same or different average lengths in a longitudinal direction.

The 1-3 internal electrode pattern may have an average length in the longitudinal direction equal to or different from that of the 1-1 internal electrode pattern or the 1-2 internal electrode pattern.

The 2-1 internal electrode pattern and the 2-2 internal electrode pattern may have the same or different average lengths in a longitudinal direction.

According to the multilayered capacitor according to one aspect, two or more types of capacitance may be implemented in one multilayered capacitor.

DETAILED DESCRIPTION

Figure 1:
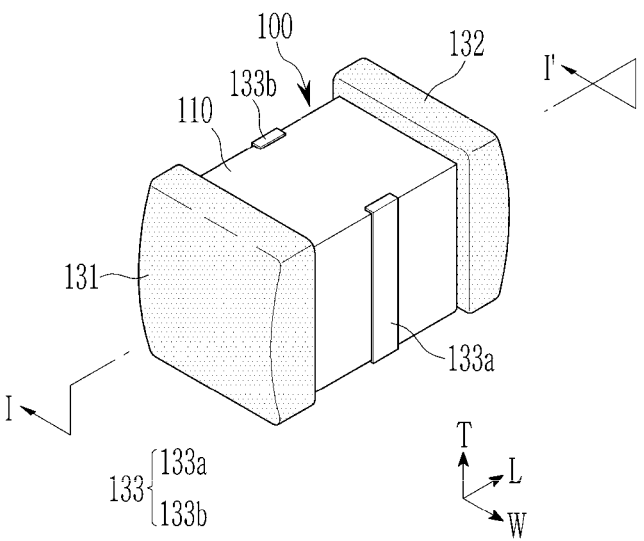
FIG. 1 is a perspective view illustrating a multilayered capacitor according to an embodiment.

The present disclosure will be described more fully hereinafter with reference to the accompanying drawings, in which embodiments of the disclosure are shown. The drawings and description are to be regarded as illustrative in nature and not restrictive. Like reference numerals designate like elements throughout the specification. Further, the accompanying drawings are provided only in order to allow embodiments disclosed in the present specification to be easily understood, and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various constituent elements, and are not to be interpreted as limiting these constituent elements. The terms are only used to differentiate one constituent element from other constituent elements.

It is to be understood that when one constituent element is referred to as being "connected" or "coupled" to another constituent element, it may be connected or coupled directly to the other constituent element or may be connected or coupled to the other constituent element with a further constituent element intervening therebetween. In contrast, it should be understood that, when it is described that an element is "directly coupled" or "directly connected" to another element, no element is present between the element and the other element.

Throughout the specification, it should be understood that the term "include", "comprise", "have", or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance. Unless explicitly described to the contrary, the word "comprise" and variations such as "comprises" or "comprising" will be understood to imply the inclusion of stated elements but not the exclusion of any other elements.

Figure 2:
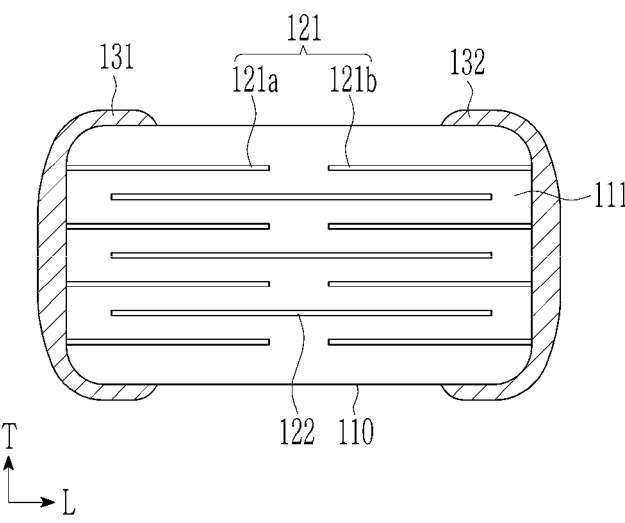
FIG. 2 is a cross-sectional view of the multilayered capacitor taken along line I-I' of FIG. 1.
Figure 3:
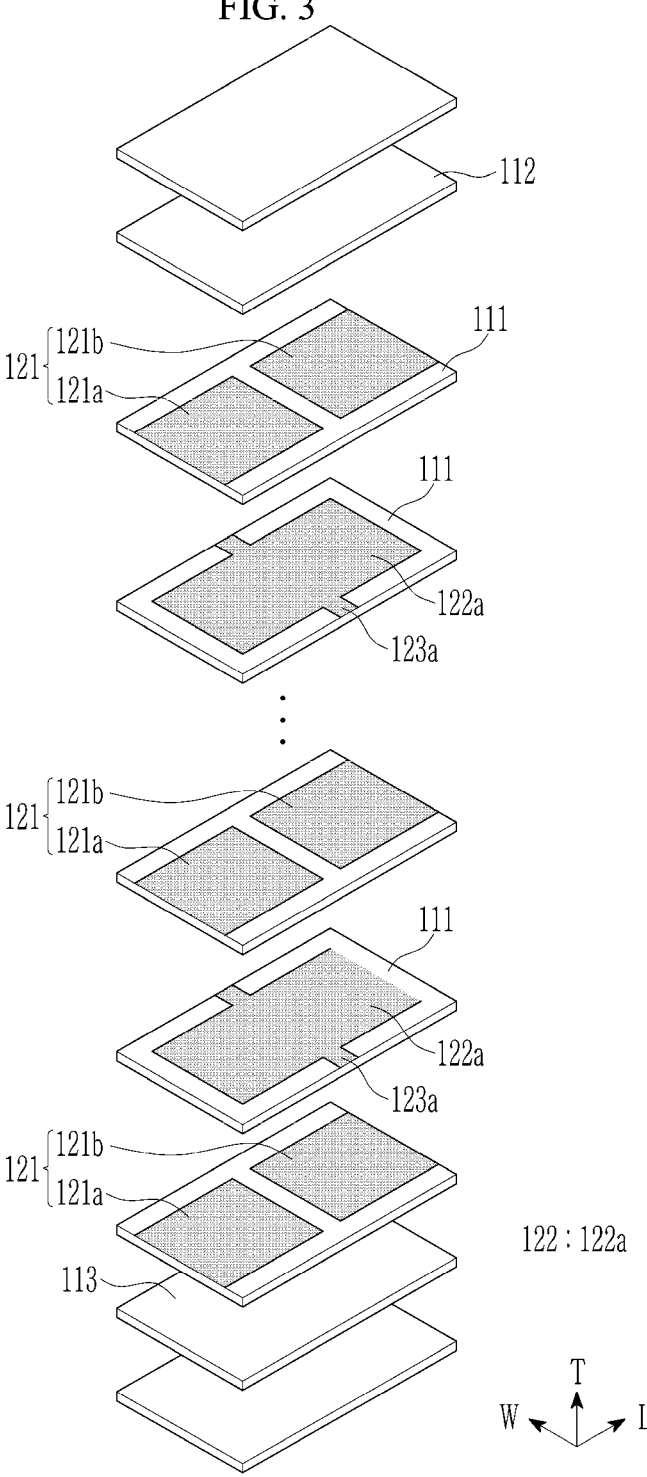
FIG. 3 is an exploded perspective view illustrating a stacked structure of internal electrode layers in the capacitor body of FIG. 1.
Figure 4:
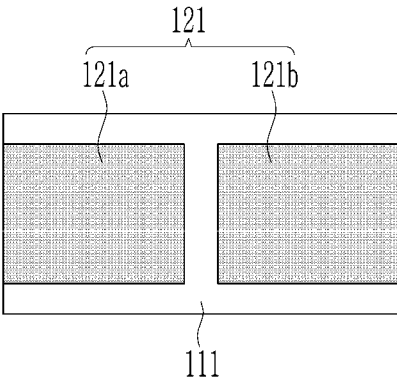
FIG. 4 is a plan view illustrating the first internal electrode layer of FIG. 3.
Figure 5:
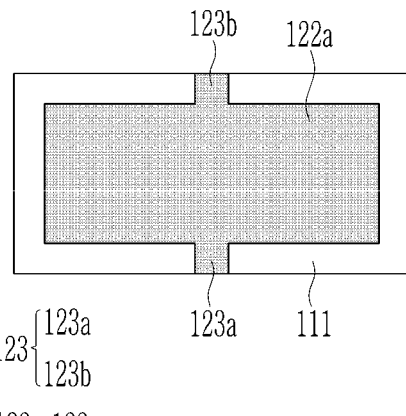
FIG. 5 is a plan view illustrating the second internal electrode layer of FIG. 3.

FIG. 1 is a perspective view illustrating a multilayered capacitor according to an embodiment, FIG. 2 is a cross-sectional view of the multilayered capacitor taken along line I-I' of FIG. 1, FIG. 3 is an exploded perspective view illustrating a stacked structure of internal electrode layers in the capacitor body 110 of FIG. 1, FIG. 4 is a plan view illustrating the first internal electrode layer 121 of FIG. 3, and FIG. 5 is a plan view illustrating the second internal electrode layer 122 of FIG. 3.

When directions are defined to clearly describe the present embodiment, the L-axis, W-axis, and T-axis indicated in the drawings represent the longitudinal direction, the width direction, and the thickness direction of the capacitor body 110, respectively. Herein, the thickness direction (T-axis direction) may be a direction perpendicular to the wide surface (main surface) of the sheet-shaped components, and may be, for example, used in the same concept as the stacking direction in which the dielectric layers 111 are stacked. The longitudinal direction (L-axis direction) may be a direction substantially perpendicular to the thickness direction (T-axis direction) in a direction extending parallel to the wide surface (main surface) of the sheet-shaped components, and may be, for example, a direction in which the first external electrode 131 and the second external electrode 132 are disposed. The width direction (W-axis direction) may be a direction that extends parallel to the wide surface (main surface) of the sheet-shaped components and is substantially perpendicular to the thickness direction (T-axis direction) and the longitudinal direction (L-axis direction), and may be, for example, a direction in which the terminal electrodes 133 are disposed on both sides.

Referring to FIGS. 1 to 5, a multilayered capacitor 100 according to the present embodiment includes a capacitor body 110, a first external electrode 131 and a second external electrode 132 disposed at opposite ends of the capacitor body 110 in the longitudinal direction (L-axis direction), and terminal electrodes 133 disposed on both sides of the capacitor body 110 in the width direction (W-axis direction).

The capacitor body 110 may have, for example, a substantially hexahedral shape.

In this embodiment, for convenience of explanation, in the capacitor body 110, both surfaces opposite to each other in the thickness direction (T-axis direction) are defined as a first surface and a second surface, both surfaces connected to the first surface and the second surface and facing each other in the longitudinal direction (L-axis direction) are defined as a third surface and a fourth surface, and both surfaces connected to the first surface and the second surface, connected to the third surface and the fourth surface, and facing each other in the width direction (W-axis direction) are defined as a fifth surface and a sixth surface. The first surface, which is the lower surface, may be a surface facing a mounting substrate.

The shapes and dimensions of the capacitor body 110 and the number of stacked dielectric layers 111 are not limited to those shown in the drawings of the present embodiment.

The capacitor body 110 is formed by stacking a plurality of the dielectric layers 111 in the T-axis direction and then sintering them, and includes a plurality of dielectric layers 111 and first internal electrode layers 121 and second internal electrode layers 122 which are alternately disposed in a thickness direction (T-axis direction) with the dielectric layers 111 interposed therebetween.

Herein, the boundary between the respective dielectric layers 111 adjacent to each other of the capacitor body 110 may be integrated to the extent that it is difficult to check without using a scanning electron microscope (SEM).

Also, the capacitor body 110 may include an active region and cover regions 112 and 113.

The active region contributes to generating capacitance of the multilayered capacitor 100. For example, the active region may be a region in which the first internal electrode layer 121 or the second internal electrode layer 122 stacked and overlapped along the thickness direction (T-axis direction).

The cover regions 112 and 113 may be respectively disposed on the first surface and second surface of the active region in the thickness direction (T-axis direction) as margin portions in the thickness direction. The cover regions 112 and 113 may be formed by stacking a single dielectric layer 111 or two or more dielectric layers 111 on an upper surface and a lower surface of the active region, respectively.

Also, the capacitor body 110 may further include a side cover region. The side cover region is a margin portion in the width direction, and may be respectively disposed on the fifth surface and the sixth surface of the active region in the width direction (W-axis direction). Such a side cover region may be formed by applying a conductive paste layer for forming an internal electrode layer on the surface of the dielectric green sheet to a portion of the surface of the dielectric green sheet, stacking dielectric green sheets to which a conductive paste layer is not applied, on both side surfaces of the dielectric green sheet, and sintering the same.

The cover regions 112 and 113 and the side cover regions serve to prevent damage to the first internal electrode layer 121 and the second internal electrode layer 122 due to physical or chemical stress.

For example, the dielectric layer 111 may include a ceramic material with a high dielectric constant. For example, the ceramic material may include a dielectric ceramic including a component such as $BaTiO_3$, $CaTiO_3$, $SrTiO_3$, $CaZrO_3$, or the like. Further, in addition to these components, auxiliary components such as a Mn compound, an Fe compound, a Cr compound, a Co compound, a Ni compound, and the like may be further included. For example, $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like in which Ca and Zr are partially dissolved in a $BaTiO_3$-based dielectric ceramic may be included.

In addition, in the dielectric layer 111, a ceramic additive, an organic solvent, a plasticizer, a binder, a dispersing agent, and the like along with the ceramic powder may be further added. The ceramic additive may be, for example, a transition metal oxide or a transition metal carbide, a rare earth element, magnesium (Mg), aluminum (Al), or the like.

For example, the dielectric layer 111 may have an average thickness of about 0.5 μm to about 10 μm.

The first internal electrode 121 and the second internal electrode 122 are alternately configured to face each other along the thickness direction (T-axis direction) with the dielectric layer 111 interposed therebetween, and the first internal electrode 121 and the second internal electrode 122 may be electrically insulated from each other by the dielectric layer 111 disposed therebetween.

The first internal electrode 121 may include n+1 first internal electrode patterns 121a and 121b. Herein, n is an integer of 1 or more, for example, may be an integer of 10 or less, an integer of 1 to 5, or an integer of 1 to 3. In FIGS. 1 to 5, a case where n is 1 is illustrated.

As an example, the first internal electrode layer 121 includes a 1-1 internal electrode pattern 121a and a 1-2 internal electrode pattern 121b at intervals along a longitudinal direction (L-axis direction) and the first internal electrode layer 121 may have a division portion extending in the width direction (W-axis direction) between the 1-1 internal electrode pattern 121a and the 1-2 internal electrode pattern 121b. The 1-1 internal electrode pattern 121a and the 1-2 internal electrode pattern 121b may be electrically insulated from each other by a division portion disposed in the middle.

An average length in the longitudinal direction (L-axis direction) of the division portion between the 1-1 internal electrode pattern 121a and the 1-2 internal electrode pattern 121b may be greater than or equal to about 5 μm.

Herein, a length in the longitudinal direction (L-axis direction) of the division portion may be obtained by polishing a L-T plane along the W-axis direction until the 1-1 internal electrode pattern 121a and the 1-2 internal electrode pattern 121b are exposed, selecting arbitrary 1-1 internal electrode patterns 121a and 1-2 internal electrode patterns 121b in the exposed cut surface, and determining the shortest length in the longitudinal direction (L-axis direction) between the selected 1-1 internal electrode pattern 121a and 1-2 internal electrode pattern 121b to the length in the longitudinal direction (L-axis direction) of the division portion.

The average length in the longitudinal direction (L-axis direction) of the division portion may be an arithmetic mean value of lengths of the division portions measured in selected arbitrary 3, 5, or 10 different 1-1 internal electrode patterns 121a and 1-2 internal electrode patterns 121b in the exposed cut surfaces. Alternatively, it may be an arithmetic mean value of the lengths of the division portions measured for the same 1-1 internal electrode pattern 121a and 1-2 internal electrode pattern 121b in arbitrary 3, 5, or 10 different cut surfaces. The measurement may be performed by, for example, an optical microscope or a scanning electron microscope (SEM). Other methods and/or tools appreciated by one of ordinary skill in the art, even if not described in the present disclosure, may also be used. A thickness of a dielectric layer 111 and a thickness of an internal electrode layer/pattern may be measured in a similar manner.

When the average length in the longitudinal direction (L-axis direction) of the division portion is less than about 5 μm, a short may occur. The upper limit of the average length in the longitudinal direction (L-axis direction) of the division portion is not particularly high, but as the average length in the longitudinal direction (L-axis direction) of the division portion increases, the capacity decreases, and thus may be appropriately set according to the capacity.

One end of the 1-1 internal electrode pattern 121a may be exposed through (or be in contact with or extend from) the third surface of the capacitor body 110 and one end of the 1-2 internal electrode pattern 121b may be exposed through (or be in contact with or extend from) the fourth surface of the capacitor body 110.

An end of the 1-1 first internal electrode pattern 121a exposed through the third surface of the capacitor body 110 may be electrically connected to the first external electrode 131, and an end of the 1-2 internal electrode pattern 121b exposed through the fourth surface of the capacitor body 110 may be electrically connected to the second external electrode 132.

The second internal electrode layer 122 may include n second internal electrode patterns 122a. Herein, n is an integer of 1 or more, for example, may be an integer of 10 or less, an integer of 1 to 5, or an integer of 1 to 3. In FIGS. 1 to 5, a case where n is 1 is illustrated.

For example, the second internal electrode layer 122 may include one second internal electrode pattern 122a.

The second internal electrode pattern 122a may have two or more draw-out patterns 123 and may be connected to two or more of the terminal electrodes 133.

For example, the second internal electrode pattern 122a may have two or more draw-out patterns 123, wherein the first draw-out pattern 123a of the second internal electrode pattern 122a may be exposed through the fifth surface of the capacitor body 110, and the second draw-out pattern 123b of the second internal electrode pattern 122a may be exposed through the sixth surface of the capacitor body 110.

The first draw-out pattern 123a of the second internal electrode pattern 122a exposed through the fifth surface of the capacitor body 110 may be electrically connected to any one of the terminal electrodes 133 on the fifth surface and the second draw-out pattern 123b of the second internal electrode pattern 122a exposed through the sixth surface of the capacitor body 110 may be electrically connected to any one of the terminal electrodes 133 on the sixth surface.

An average length in the longitudinal direction (L-axis direction) of the draw-out pattern 123 may be about 150 μm to about 250 μm.

Herein, a length in the longitudinal direction (L-axis direction) of the draw-out pattern 123 may be obtained by polishing a L-T plane along the W-axis direction until the draw-out pattern 123, selecting arbitrary draw-out pattern 123 in the exposed cut surface, and determining the shortest length in the longitudinal direction (L-axis direction) of the selected draw-out pattern 123 to be the length in the longitudinal direction (L-axis direction) of the draw-out pattern 123.

The average length in the longitudinal direction (L-axis direction) of the draw-out pattern 123 may be an arithmetic mean value of lengths of the draw-out patterns 123 measured in selected arbitrary 3, 5, or 10 different draw-out patterns 123 in the exposed cut surfaces. Alternatively, it may be an arithmetic mean value of the lengths of the draw-out patterns 123 measured for the same draw-out pattern 123 in arbitrary 3, 5, or 10 different cut surfaces.

The average length in the longitudinal direction (L-axis direction) of the draw-out pattern 123 may be measured for the average length in the longitudinal direction (L-axis direction) of the first draw-out pattern 123a or the second draw-out pattern 123b.

The second internal electrode pattern 122a may be disposed to be overlapped with two or more of the first internal electrode patterns 121a and 121b. For example, the second internal electrode pattern 122a may be overlapped with the 1-1 internal electrode pattern 121a and the 1-2 internal electrode pattern 121b in the thickness direction (T-axis direction).

Accordingly, as one second internal electrode pattern 122a is overlapped with the 1-1 internal electrode pattern 121a and the 1-2 internal electrode pattern 121b to form two active regions and is connected to at least two terminal electrodes 133, the multilayered capacitor 100 may realize at least two or more capacities in one multilayered capacitor 100.

In other words, in the multilayered capacitor 100, the first internal electrode layer 121 and the second internal electrode layer 122 are not only connected in parallel but also in parallel and in series, so that various capacities may be realized. In addition, when the numbers of the first internal electrode patterns 121a and 121b, the second internal electrode pattern 122a, and the terminal electrodes 133 are increased with this concept, more capacity may be realized.

In addition, since the multilayered capacitor 100 has the same floating internal electrode as the second internal electrode pattern 122a, even though a portion of the multilayered capacitor 100 is cracked, for example, bent and the like, a short may not occur at all terminals constituting the multilayered capacitor 100.

However, when the first terminal electrode 133a and the second terminal electrode 133b are connected to each other in terms of the structure of the multilayered capacitor 100, since there is always a short, the first terminal electrode 133a and the second terminal electrode 133b are not connected to each other.

Also, the average lengths of the first internal electrode patterns 121a and 121b in the longitudinal direction (L-axis direction) may be the same or different from each other. When the average lengths of the first internal electrode patterns 121a and 121b in the longitudinal direction (the L-axis direction) are different from each other, two or more types of capacitance that are not equal to each other may be implemented in one multilayered capacitor 100.

Figure 6:
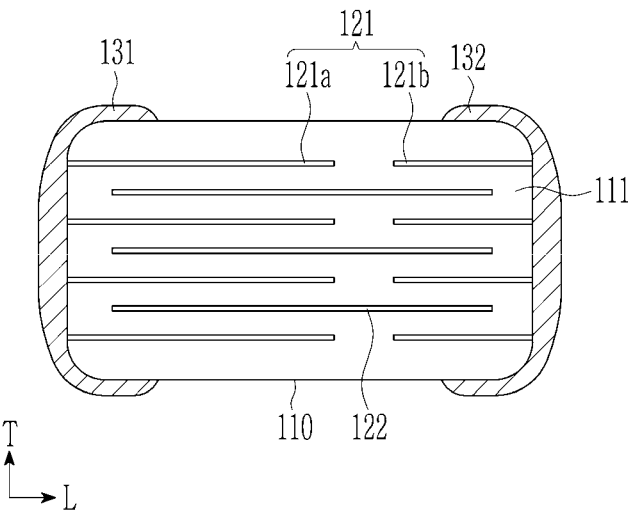
FIG. 6 is a cross-sectional view taken along line I-I' of a multilayered capacitor according to another embodiment.
Figure 7:
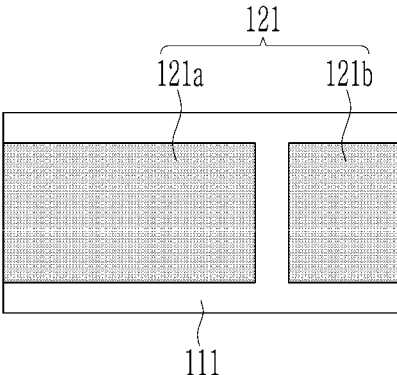
FIG. 7 is a plan view illustrating the first internal electrode layer of FIG. 6.
Figure 8:
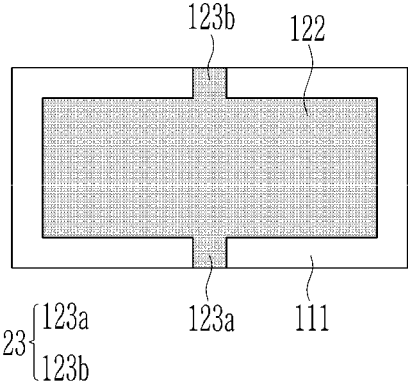
FIG. 8 is a plan view illustrating the second internal electrode layer of FIG. 6.

FIG. 6 is a cross-sectional view taken along line I-I' of the multilayered capacitor 100 according to another embodiment, FIG. 7 is a plan view illustrating the first internal electrode layer 121 of FIG. 6, and FIG. 8 is a plan view showing the internal electrode layer 122. A perspective view of the multilayered capacitor 100 according to another embodiment is the same as that of FIG. 1.

Referring to FIGS. 6 to 8, the 1-1 internal electrode pattern 121a and the 1-2 internal electrode pattern 121b may have different average lengths in the longitudinal direction (L-axis direction). For example, the average length in the longitudinal direction (L-axis direction) of the 1-1 internal electrode pattern 121a may be greater than the average length in the longitudinal direction (L-axis direction) of the 1-2 internal electrode pattern 121b.

Herein, a length in the longitudinal direction (L-axis direction) of the 1-1 internal electrode pattern 121a may be obtained by polishing a L-T plane along the W-axis direction until the 1-1 internal electrode pattern 121a is exposed, selecting arbitrary 1-1 internal electrode pattern 121a in the exposed cut surface, and determining a length of the shortest line segment connecting one end to the other end of the selected 1-1 internal electrode pattern 121a in the longitudinal direction (L-axis direction) to be the length in the longitudinal direction (L-axis direction) of the 1-1 internal electrode pattern 121a.

The average length in the longitudinal direction (L-axis direction) of the 1-1 internal electrode pattern 121a may be an arithmetic mean value of lengths of the 1-1 internal electrode patterns 121a measured in selected arbitrary 3, 5, or 10 different 1-1 internal electrode patterns 121a in the exposed cut surfaces. Alternatively, the average length in the longitudinal direction (L-axis direction) of the 1-1 internal electrode pattern 121a may be an arithmetic mean value of the lengths of the 1-1 internal electrode patterns 121a measured for the same 1-1 internal electrode patterns 121a in arbitrary 3, 5, or 10 different cut surfaces.

The average length in the longitudinal direction (L-axis direction) of the 1-2 internal electrode pattern 121b may be obtained in the same manner as the average length in the longitudinal direction (L-axis direction) of the 1-1 internal electrode pattern 121a.

The first internal electrode layer 121 and the second internal electrode layer 122 may include a conductive metal, for example, a metal such as Ni, Cu, Ag, Pd, Au, or an alloy thereof, for example, an Ag—Pd alloy.

Also, the first internal electrode layer 121 and the second internal electrode layer 122 may include dielectric particles having the same composition as the ceramic material included in the dielectric layer 111.

For example, the average thickness of the first internal electrode layer 121 and the second internal electrode layer 122 may be about 0.1 μm to about 2 μm.

The first external electrode 131 and the second external electrode 132 may be provided with voltages having different polarities and electrically connected to the exposed portion of the internal electrode pattern 121a and the exposed portion of the internal electrode pattern 121b, respectively.

The first external electrode 131 and the second external electrode 132 may respectively include a first connection portion and a second connection portion disposed on the third surface and the fourth surface of the capacitor body 110 and connected to the internal electrode pattern 121a of the first internal electrode layer 121 and the internal electrode pattern 121b of the first internal electrode layer 121, and may also include a first band portion and a second band portion disposed at each corner where the first surface and the second surface of the capacitor body 110 and the third surface and the fourth surface thereof meet.

The first band portion and the second band portion may extend from the first connection portion and the second connection portion to portions of the first surface and second surface of the capacitor body 110, respectively. The first band portion and the second band portion may respectively further extend from the first connection portion and the second connection portion to the portions of the fifth surface and the sixth surface of the capacitor body 110. The first band portion and the second band portion may serve to improve adhesion strength of the first external electrode 131 and the second external electrode 132.

For example, the first external electrode 131 and the second external electrode 132 may respectively include a first base electrode and a second base electrode in contact with the capacitor body 110, a first middle electrode and a second middle electrode configured to cover the first base electrode and the second base electrode, respectively, and a first surface electrode and a second surface electrode configured to cover the first middle electrode and the second middle electrode, respectively.

The first base electrode and the second base electrode may include copper (Cu). In addition, the first base electrode and the second base electrode may include copper (Cu) as a main component, one or more materials of nickel (Ni), tin (Sn), palladium (Pd), platinum (Pt), gold (Au), silver (Ag), tungsten (W), titanium (Ti), lead (Pb), or an alloy thereof, and glass.

For example, the first base electrode and the second base electrode may be formed in a method of dipping the capacitor body 110 in a conductive paste including a conductive metal and glass, printing the conductive paste on the surface of the capacitor body 110 through screen printing, gravure printing, or the like, and applying the conductive paste onto the surface of the capacitor body 110 or transferring a dry film formed by drying the conductive paste onto the capacitor body 110.

The first and second base electrodes are formed of the aforementioned conductive paste and thus may increase density of the first external electrode 131 and the second external electrode 132 due to the glass added thereto as well as maintain sufficient conductivity, and thereby effectively suppress penetration of a plating solution and/or external moisture.

For example, the glass component included in the first and second base electrodes may have a composition in which oxides are mixed, and the metal oxides may be one or more selected from a silicon oxide, a boron oxide, an aluminum oxide, a transition metal oxide, an alkali metal oxide, and an alkali earth metal oxide. The transition metal may be selected from zinc (Zn), titanium (Ti), copper (Cu), vanadium (V), manganese (Mn), iron (Fe), and nickel (Ni), the alkali metal may be at least one selected from lithium (Li), sodium (Na), and potassium (K), and the alkaline earth metal may be at least one selected from magnesium (Mg), calcium (Ca), strontium (Sr), and barium (Ba).

The first middle electrode and the second middle electrode may be formed on the first base electrode and the second base electrode, and may be formed to completely cover the first base electrode and the second base electrode.

The first middle electrode and the second middle electrode may include a conductive metal including copper (Cu), silver (Ag), nickel (Ni), or a mixture thereof and a base resin.

The base resin included in the first middle electrode and the second middle electrode is not particularly limited as long as it has adhesiveness and shock absorption, and can be mixed with conductive metal powder to make a paste, and may include, for example, an epoxy-based resin.

The conductive metal included in the first middle electrode and the second middle electrode is not particularly limited as long as it is a material that can be electrically connected to the first base electrode and the second base electrode, and may include, for example, copper (Cu), silver (Ag), nickel (Ni), or a mixture thereof.

The first middle electrode and the second middle electrode extend to the first surface and the second surface of the capacitor body 110, wherein a length of a region disposed by the extension of the first middle electrode and the second middle electrode to the first surface and the second surface of the capacitor body 110 may be longer than that of a region disposed by the extension of the first base electrode and the second base electrode to the first surface and the second surface of the capacitor body 110.

In other words, the first middle electrode and the second middle electrode may be respectively formed on the first base electrode and the second base electrode and completely cover the first base electrode and the second base electrode.

For example, the first surface electrode and the second surface electrode may include nickel (Ni) as a main component, and may further include copper (Cu), tin (Sn), palladium (Pd), platinum (Pt), gold (Au), silver (Ag), tungsten (W), titanium (Ti), or lead (Pb) alone or as alloy thereof. The first surface electrode and the second surface electrode may improve mountability of the multilayered capacitor 100 on a board, structural reliability, external durability, heat resistance, and equivalent series resistance (ESR).

For example, the first surface electrode and the second surface electrode may be formed through plating. The first surface electrode and the second surface electrode may be formed through sputtering or electroplating (electric deposition).

The multilayered capacitor 100 may include 2n or more terminal electrodes 133. Herein, n is an integer of 1 or more, for example, may be an integer of 10 or less, an integer of 1 to 5, or an integer of 1 to 3. In FIG. 1, a case where n is 1 is illustrated.

For example, the multilayered capacitor 100 may include a first terminal electrode 133a disposed outside the fifth surface of the capacitor body 110 and a second terminal electrode 133b disposed outside the sixth surface of the capacitor body 110.

The first terminal electrode 133a may be electrically connected to a first draw-out pattern 123a of the second internal electrode pattern 122a, which is exposed through (or is contact with or extends from) the fifth surface of the capacitor body 110, and the second terminal electrode 133b may be electrically connected to a second draw-out pattern 123b of the second internal electrode pattern 122a, which is exposed through (or is contact with or extends from) the sixth surface of the capacitor body 110.

The terminal electrode 133 is the same as the first external electrode 131 and the second external electrode 132 except for being disposed at both sides of the capacitor body 110 in the width direction. Accordingly, the terminal electrode 133 may respectively include a first connection portion and a second connection portion respectively disposed on the fifth and sixth surfaces of the capacitor body 110 and a first band portion and a second band portion disposed at each corner where the first surface and the second surface and the fifth surface and the sixth surface of the capacitor body 110 meet. In addition, the terminal electrode 133 may include the first base electrode and the second base electrode in contact with the capacitor body 110, the first middle electrode and the second middle electrode, and a first surface electrode and a second surface electrode respectively disposed to cover the first base electrode and the second base electrode. Since the descriptions therefor are the same as that described for the first external electrode 131 and the second external electrode 132, a repetitive description thereof will be omitted.

The terminal electrode 133 may cover all of the draw-out patterns 123 so that the draw-out patterns 123 may not be exposed, for example, a longitudinal direction (L-axis direction) central portion of the terminal electrode 133 may be overlapped with a longitudinal direction (L-axis direction) central portion of the draw-out patterns 123.

An average length in the longitudinal direction (L-axis direction) of the terminal electrode 133 may be longer, for example, greater than or equal to about 40 μm or greater than or equal to about 70 μm longer than a length in the longitudinal direction (L-axis direction) of the draw-out pattern 123. For example, the average length in the longitudinal direction (L-axis direction) of the terminal electrode 133 may be about 190 μm to about 500 μm.

Herein, the length in the longitudinal direction (L-axis direction) of the terminal electrode 133 may be the shortest length in the longitudinal direction (L-axis direction) of the terminal electrode 133 on the L-T plane.

The average length in the longitudinal direction (L-axis direction) of the terminal electrode 133 may be an arithmetic mean value of the length in the longitudinal direction (L-axis direction) of the first terminal electrode 133a and the length in the longitudinal direction (L-axis direction) of the second terminal electrode 133b.

Figure 9:
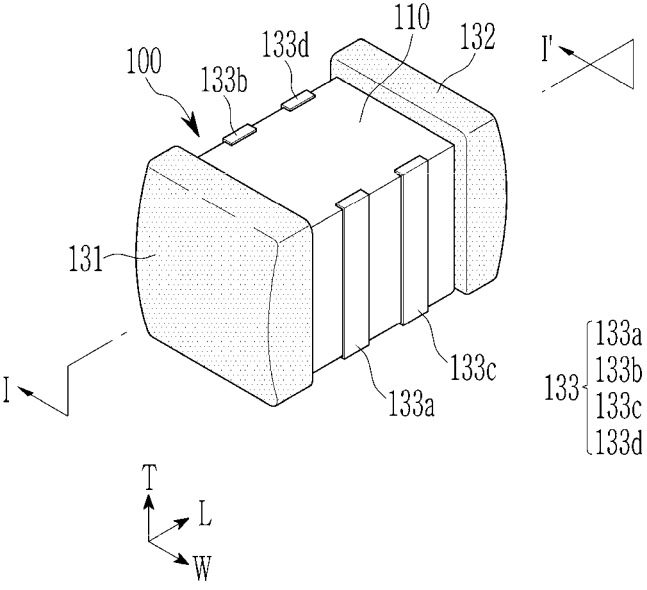
FIG. 9 is a perspective view illustrating a multilayered capacitor according to another embodiment.
Figure 10:
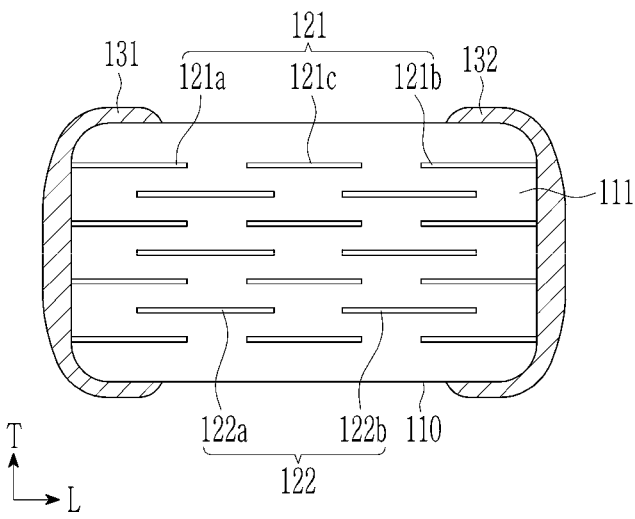
FIG. 10 is a cross-sectional view of the multilayered capacitor taken along line I-I' of FIG. 9.
Figure 11:
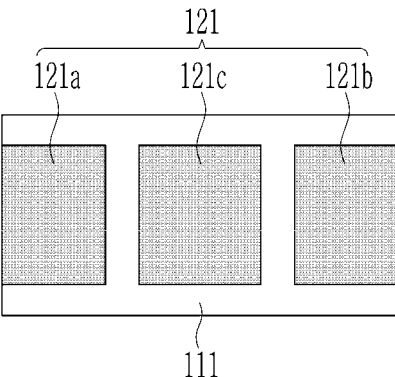
FIG. 11 is a plan view illustrating the first internal electrode layer of FIG. 9.
Figure 12:
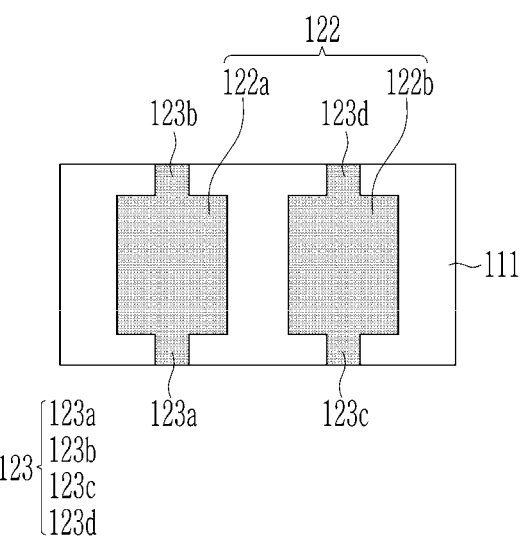
FIG. 12 is a plan view illustrating the second internal electrode layer of FIG. 9.

FIG. 9 is a perspective view of the multilayered capacitor 100 according to another embodiment, FIG. 10 is a cross-sectional view of the multilayered capacitor 100 taken along line I-I' of FIG. 9, FIG. 11 is a plan view illustrating the first internal electrode layer 121 of FIG. 9, and FIG. 12 is a plan view illustrating the second internal electrode layer 122 of FIG. 9.

Since the electronic component according to the present embodiment is similar to the aforementioned electronic component, overlapped descriptions will be omitted, and differences will be mainly described.

In FIGS. 9 to 12, a case where n is 2 is illustrated.

Accordingly, the multilayered capacitor 100 includes three first internal electrode patterns 121a, 121b, and 121c, two second internal electrode patterns 122a and 122b, and four or more terminal electrodes 133.

For example, the first internal electrode layer 121 may include a 1-1 internal electrode pattern 121a, a 1-3 internal electrode pattern 121c, and a 1-2 internal electrode pattern 121b disposed at intervals sequentially along the longitudinal direction (L-axis direction).

The first internal electrode layer 121 may have a division portion extending in the width direction (W-axis direction) between the 1-1 internal electrode pattern 121a and the 1-3 internal electrode pattern 121c and also, another division portion extended in the width direction (W-axis direction) between the 1-1 internal electrode pattern 121c and the 1-2 internal electrode pattern 121b.

The 1-1 internal electrode pattern 121a and the 1-3 internal electrode pattern 121c may be electrically insulated each other by the division portion disposed therebetween, and likewise, the 1-3 internal electrode pattern 121c and the 1-2 internal electrode pattern 121b may be electrically insulated each other by the division portion disposed therebetween.

The 1-1 internal electrode pattern 121a may be exposed through (or be in contact with or extend from) the third surface of the capacitor body 110, and one end of the 1-2 internal electrode pattern 121b may be exposed through (or be in contact with or extend from) the fourth surface of the capacitor body 110.

An end of the 1-1 internal electrode pattern 121a exposed through the third surface of the capacitor body 110 may be electrically connected to the first external electrode 131, and an end of the 1-2 internal electrode pattern 121b exposed through the fourth surface of the capacitor body 110 may be electrically connected to the second external electrode 132.

On the contrary, the 1-3 internal electrode pattern 121c is located inside the capacitor body 110 but not exposed through (or not in contact with or not extend from) the third to sixth surfaces. Accordingly, the 1-3 internal electrode pattern 121c is not electrically connected neither to the first external electrode 131 and the second external electrode 132 nor to the terminal electrodes 133.

The second internal electrode layer 122 includes 2-1 internal electrode pattern 122a and 2-2 internal electrode pattern 122b disposed at intervals along the longitudinal direction (L-axis direction) and may have a division portion extending along the width direction (W-axis direction) between the 2-1 internal electrode pattern 122a and the 2-2 internal electrode pattern 122b. The 2-1 internal electrode pattern 122a and the 2-2 internal electrode pattern 122b may be electrically insulated each other by the division portion disposed therebetween.

An average length in the longitudinal direction (L-axis direction) of the division portion between the 2-1 internal electrode pattern 122a and the 2-2 internal electrode pattern 122b may be greater than or equal to about 5 μm.

Herein, a length in the longitudinal direction (L-axis direction) of the division portion may be obtained by polishing a L-T plane along the W-axis direction until the 2-1 internal electrode pattern 122a and the 2-2 internal electrode pattern 122b are exposed, selecting arbitrary 2-1 internal electrode pattern 122a and 2-2 internal electrode pattern 122b in the exposed cut surface, and determining the shortest length in the longitudinal direction (L-axis direction)

between the selected 2-1 internal electrode pattern 122a and 2-2 internal electrode pattern 122b to the length in the longitudinal direction (L-axis direction) of the division portion.

The average length in the longitudinal direction (L-axis direction) of the division portion may be an arithmetic mean value of lengths of the division portions measured in selected arbitrary 3, 5, or 10 different 2-1 internal electrode patterns 122a and 2-2 internal electrode patterns 122b in the exposed cut surfaces. Alternatively, it may be an arithmetic mean value of the lengths of the division portions measured for the same 2-1 internal electrode pattern 122a and 2-2 internal electrode pattern 122b in arbitrary 3, 5, or 10 different cut surfaces.

When the average length in the longitudinal direction (L-axis direction) of the division portion is less than about 5 μm, a short may occur. The upper limit of the average length in the longitudinal direction (L-axis direction) of the division portion is not particularly high, but as the average length in the longitudinal direction (L-axis direction) of the division portion increases, the capacity decreases, and thus may be appropriately set according to the capacity.

The 2-1 internal electrode pattern 122a may have two or more draw-out patterns 123 to be connected to two or more of the terminal electrodes 133, and the 2-2 internal electrode pattern 122b may also have two or more draw-out patterns 123 to be connected to two or more of the terminal electrodes 133.

For example, the 2-1 internal electrode pattern 122a has two draw-out patterns 123, wherein the first draw-out pattern 123a of the 2-1 internal electrode pattern 122a is exposed through (or is in contact with or extends from) the fifth surface of the capacitor body 110 and electrically connected to the first terminal electrode 133a positioned on the fifth surface, and the second draw-out pattern 123b of the 2-1 internal electrode pattern 122a is exposed through (or is in contact with or extends from) the sixth surface of the capacitor body 110 and electrically connect to the second terminal electrode 133b positioned on the sixth surface.

Similarly, the 2-2 internal electrode pattern 122b has two draw-out patterns 123, wherein the third draw-out pattern 123c of the 2-2 internal electrode pattern 122b is exposed through (or is in contact with or extends from) the fifth surface of the capacitor body 110 and electrically connected to the third terminal electrode 133c positioned on the fifth surface, and the fourth draw-out pattern 123d of the 2-2 internal electrode pattern 122b is exposed through (or is in contact with or extends from) the sixth surface of the capacitor body 110 and electrically connected to the fourth terminal electrode 133d positioned on the sixth surface.

The 2-1 internal electrode pattern 122a is overlapped with the 1-1 internal electrode pattern 121a and the 1-3 internal electrode pattern 121c in the thickness direction (T-axis direction), and the 2-2 internal electrode pattern 122b is overlapped with the 1-3 internal electrode pattern 121c and the 1-2 internal electrode pattern 121b in the thickness direction (T-axis direction).

Accordingly, two second internal electrode patterns 122a and 122b are overlapped with three first internal electrode patterns 121a, 121b, and 121c to form three active regions and thus connected to four terminal electrodes 133, so that the multilayered capacitor 100 may realize about 2 types to about 6 types of capacity in one multilayered capacitor 100.

In addition, the first internal electrode patterns 121a, 121b, and 121c may have the same or different average length in the longitudinal direction (L-axis direction), and the second internal electrode patterns 122a and 122b may have the same or different average length in the longitudinal direction (L-axis direction). When the first internal electrode patterns 121a, 121b, and 121c and the second internal electrode patterns 122a and 122b have a different average length in the longitudinal direction (L-axis direction), at least two different types of capacity may be realized in one multilayered capacitor 100.

Figure 13:
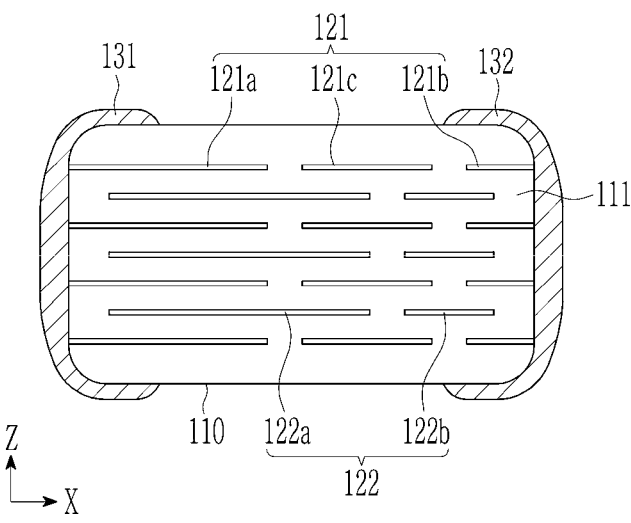
FIG. 13 is a cross-sectional view taken along line I-I' of a multilayered capacitor according to another embodiment.
Figure 14:
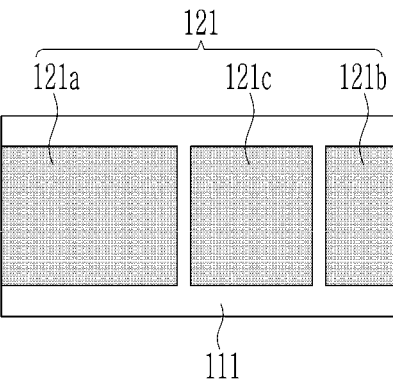
FIG. 14 is a plan view illustrating the first internal electrode layer of FIG. 13.
Figure 15:
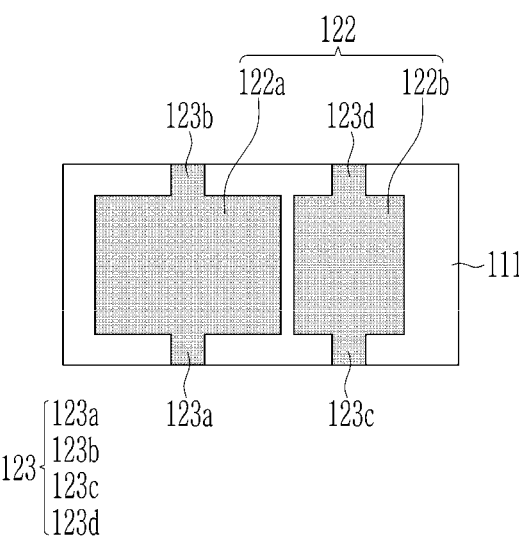
FIG. 15 is a plan view illustrating the second internal electrode layer of FIG. 13.

FIG. 13 is a cross-sectional view taken along line I-I' of the multilayered capacitor 100 according to another embodiment, FIG. 14 is a plan view illustrating the first internal electrode layer 121 of FIG. 13, and FIG. 15 is a plan view illustrating the second internal electrode layer 122 of FIG. 13. A perspective view of the multilayered capacitor 100 according to another embodiment is the same as that of FIG. 1.

Referring to FIGS. 13 to 15, the 1-1 internal electrode pattern 121a to the 1-3 internal electrode pattern 121c have a different average length in the longitudinal direction (L-axis direction). For example, the average length in the longitudinal direction (L-axis direction) of the 1-1 internal electrode pattern 121a is longer than the average length in the longitudinal direction (L-axis direction) of the 1-3 internal electrode pattern 121c, and the average length in the longitudinal direction (L-axis direction) of the 1-3 internal electrode pattern 121c may be longer than the average length in the longitudinal direction (L-axis direction) of the 1-2 internal electrode pattern 121b.

Herein, a length in the longitudinal direction (L-axis direction) of the 1-1 internal electrode pattern 121a may be obtained by polishing a L-T plane along the W-axis direction until the 1-1 internal electrode pattern 121a is exposed, selecting arbitrary 1-1 internal electrode pattern 121a in the exposed cut surface, and determining a length of the shortest line segment connecting one end to the other end of the selected 1-1 internal electrode pattern 121a in the longitudinal direction (L-axis direction) to be the length in the longitudinal direction (L-axis direction) of the 1-1 internal electrode pattern 121a.

The average length in the longitudinal direction (L-axis direction) of the 1-1 internal electrode pattern 121a may be an arithmetic mean value of lengths of the 1-1 internal electrode patterns 121a measured in selected arbitrary 3, 5, or 10 different 1-1 internal electrode patterns 121a in the exposed cut surfaces. Alternatively, the average length in the longitudinal direction (L-axis direction) of the 1-1 internal electrode pattern 121a may be an arithmetic mean value of the lengths of the 1-1 internal electrode patterns 121a measured for the same 1-1 internal electrode patterns 121a in arbitrary 3, 5, or 10 different cut surfaces.

The average lengths in the longitudinal direction (L-axis direction) of the 1-2 internal electrode pattern 121b and the 1-3 internal electrode pattern 121c may be obtained in the same manner as the average length in the longitudinal direction (L-axis direction) of the 1-1 internal electrode pattern 121a.

In addition, the 2-1 internal electrode pattern 122a and the 2-2 internal electrode pattern 122b have different average lengths each other in the longitudinal direction (L-axis direction). For example, the average length in the longitudinal direction (L-axis direction) of the 2-1 internal electrode pattern 122a may be longer than the average length in the longitudinal direction (L-axis direction) of the 2-2 internal electrode pattern 122b.

Herein, a length in the longitudinal direction (L-axis direction) of the 2-1 internal electrode pattern 122a may be obtained by polishing a L-T plane along the W-axis direction until the 2-1 internal electrode pattern 122a is exposed, selecting arbitrary 2-1 internal electrode pattern 122a in the exposed cut surface, and determining a length of the shortest line segment connecting one end to the other end of the selected 2-1 internal electrode pattern 122a in the longitudinal direction (L-axis direction) to be the length in the longitudinal direction (L-axis direction) of the 2-1 internal electrode pattern 122a.

The average length in the longitudinal direction (L-axis direction) of the 2-1 internal electrode pattern 122a may be an arithmetic mean value of lengths of the 2-1 internal electrode patterns 122a measured in selected arbitrary 3, 5, or 10 different 2-1 internal electrode patterns 122a in the exposed cut surfaces. Alternatively, the average length in the longitudinal direction (L-axis direction) of the 2-1 internal electrode pattern 122a may be an arithmetic mean value of the lengths of the 2-1 internal electrode patterns 122a measured for the same 2-1 internal electrode patterns 122a in arbitrary 3, 5, or 10 different cut surfaces.

The average length in the longitudinal direction (L-axis direction) of the 2-2 internal electrode pattern 122b may be obtained in the same manner as the average length in the longitudinal direction (L-axis direction) of the 2-1 internal electrode pattern 122a.

On the other hand, the capacitor body 110 may include first terminal electrode 133a and third terminal electrode 133c disposed outside the fifth surface of the multilayered capacitor 100 and second terminal electrode 133b and fourth terminal electrode 133d disposed outside the sixth surface of the multilayered capacitor 100.

The first terminal electrode 133a and the third terminal electrode 133c are disposed at intervals along the longitudinal direction (L-axis direction) on the fifth surface, and the second terminal electrode 133b and the fourth terminal electrode 133d may be disposed at intervals along the longitudinal direction (L-axis direction) on the sixth surface.

The first terminal electrode 133a is electrically connected to the first draw-out pattern 123a of the 2-1 internal electrode pattern 122a exposed through the fifth surface of the capacitor body 110, and the second terminal electrode 133b may be electrically connected to the second draw-out pattern 123b of the 2-1 internal electrode pattern 122a exposed to the sixth surface of the capacitor body 110. The third terminal electrode 133c is electrically connected to the third draw-out pattern 123c of the 2-2 internal electrode pattern 122b exposed through the fifth surface of the capacitor body 110, and the fourth terminal electrode 133d may be electrically connect to the fourth draw-out pattern 123d of the 2-2 internal electrode pattern 122b exposed through the sixth of the capacitor body 110.

The multilayered capacitor 100, as n increases, may include the 1-3 internal electrode patterns 121c, the 2-2 internal electrode patterns 122b, the third terminal electrode 133c, and the fourth terminal electrode 133d all in plural.

Herein, each of the plurality of 1-3 internal electrode patterns 121c is electrically connected neither to the first external electrode 131 and the second external electrode 132 nor to the terminal electrodes 133, and each of the plurality of 2-2 internal electrode patterns 122b is electrically connected to the third terminal electrode 133c and the fourth terminal electrode 133d and may be overlapped with two 1-3 internal electrode patterns 121c in the thickness direction (T-axis direction).

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

What is claimed is:

1. A multilayered capacitor, comprising
a capacitor body including a dielectric layer and a first internal electrode layer and a second internal electrode layer stacked with the dielectric layer interposed therebetween;
a first external electrode and a second external electrode on both sides of the capacitor body in a longitudinal direction; and
2n or more terminal electrodes on both sides of the capacitor body in a width direction,
wherein the first internal electrode layer includes n+1 first internal electrode patterns,
the second internal electrode layer includes n second internal electrode patterns,
n is an integer greater than or equal to 2, and
the remaining first internal electrode patterns, except for two first internal electrode patterns of the n first internal electrode patterns respectively connected to the first external electrode and the second external electrode, are spaced apart from the first external electrode, the second external electrode, and the 2n or more terminal electrodes.

2. The multilayered capacitor of claim 1, wherein
the n+1 first internal electrode patterns are disposed at intervals along the longitudinal direction, and
the first internal electrode layer has a division portion extending in the width direction between the n+1 first internal electrode patterns.

3. The multilayered capacitor of claim 2, wherein
an average length in the longitudinal direction of the division portion is greater than or equal to about 5 μm.

4. The multilayered capacitor of claim 1, wherein
one of the n+1 first internal electrode patterns is connected to the first external electrode, and another one of the n+1 first internal electrode patterns is connected to the second external electrode.

5. The multilayered capacitor of claim 1, wherein
one of the n second internal electrode patterns is connected to two or more of the 2n or more terminal electrodes.

6. The multilayered capacitor of claim 5, wherein
the two or more terminal electrodes connected to the one second internal electrode pattern are spaced apart from each other.

7. The multilayered capacitor of claim 1, wherein
one of the n second internal electrode patterns has two or more draw-out patterns connected to two or more of the 2n or more terminal electrodes.

8. The multilayered capacitor of claim 7, wherein
an average length in the longitudinal direction of the draw-out patterns is about 150 μm to about 250 μm,
an average length in the longitudinal direction of the terminal electrode is about 190 μm to about 500 μm.

9. The multilayered capacitor of claim 1, wherein
the n second internal electrode patterns are disposed at intervals along the longitudinal direction, and
the second internal electrode layer has a division portion extending in the width direction between the n second internal electrode patterns.

10. The multilayered capacitor of claim 1, wherein
the n second internal electrode patterns are configured to be overlapped with two or more of the n+1 first internal electrode patterns.

11. The multilayered capacitor of claim 1, wherein
the n+1 first internal electrode patterns have the same average length in the longitudinal direction, and
the n second internal electrode patterns have the same average length in the longitudinal direction.

12. The multilayered capacitor of claim 1, wherein
the n+1 first internal electrode patterns have different average lengths in the longitudinal direction, and
the n second internal electrode patterns have different average lengths in the longitudinal direction.

13. A multilayered capacitor, comprising
a capacitor body including a dielectric layer and a first internal electrode layer and a second internal electrode layer stacked with the dielectric layer interposed therebetween;
a first external electrode and a second external electrode on both sides of the capacitor body in a longitudinal direction; and
a first terminal electrode to a fourth terminal electrode on both sides of the capacitor body in a width direction,
wherein the first internal electrode layer includes a 1-1 internal electrode pattern connected to the first external electrode, a 1-2 internal electrode pattern connected to the second external electrode, and a 1-3 internal electrode pattern disposed at intervals in the longitudinal direction between the 1-1 internal electrode pattern and the 1-2 internal electrode pattern,
the second internal electrode layer includes a 2-1 internal electrode pattern connected to the first terminal electrode and the second terminal electrode, and a 2-2 internal electrode pattern connected to the third terminal electrode and the fourth terminal electrode,
the 2-1 internal electrode pattern is configured to be overlapped with the 1-1 internal electrode pattern and the 1-2 internal electrode pattern, and
the 2-2 internal electrode pattern is configured to be overlapped with the 1-2 internal electrode pattern and the 1-3 internal electrode pattern.

14. A multilayered capacitor, comprising
a capacitor body including a dielectric layer and a first internal electrode layer and a second internal electrode layer stacked with the dielectric layer interposed therebetween;
a first external electrode and a second external electrode on both sides of the capacitor body in a longitudinal direction; and
2n or more terminal electrodes on both sides of the capacitor body in a width direction,
wherein the first internal electrode layer includes n+1 first internal electrode patterns,
the second internal electrode layer includes n second internal electrode patterns,
n is an integer greater than or equal to 2,
each of the n second internal electrode patterns overlaps with two patterns among the n+1 first internal electrode patterns, and
one of the n+1 first internal electrode patterns is connected to the first external electrode, and another one of the n+1 first internal electrode patterns is connected to the second external electrode.

15. The multilayered capacitor of claim 14, wherein
the n+1 first internal electrode patterns are disposed at intervals along the longitudinal direction, and
the first internal electrode layer has a division portion extending in the width direction between the n+1 first internal electrode patterns.

16. The multilayered capacitor of claim 15, wherein
an average length in the longitudinal direction of the
division portion is greater than or equal to about 5 μm.

17. The multilayered capacitor of claim 14, wherein
one of the n second internal electrode patterns is con-
nected to two or more of the 2n or more terminal
electrodes.

18. The multilayered capacitor of claim 17, wherein
the two or more terminal electrodes connected to the one
second internal electrode pattern are spaced apart from
each other.

19. The multilayered capacitor of claim 14, wherein
one of the n second internal electrode patterns has two or
more draw-out patterns connected to two or more of the
2n or more terminal electrodes.

\* \* \* \* \*